UNITED STATES PATENT OFFICE.

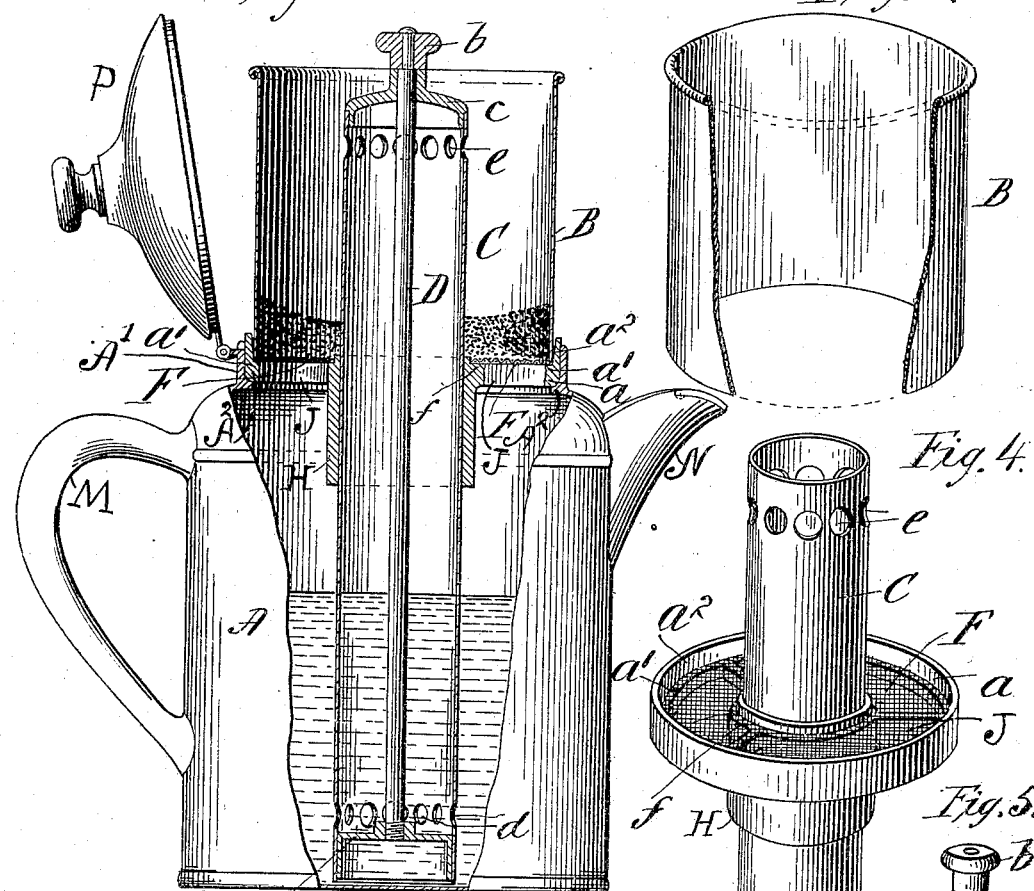

CHARLES H. ATKINS, OF SPRINGFIELD, MASSACHUSETTS.

COFFEE-POT.

SPECIFICATION forming part of Letters Patent No. 725,193, dated April 14, 1903.

Application filed July 12, 1902. Serial No. 115,322. (No model.)

*To all whom it may concern:*

Be it known that I, CHARLES H. ATKINS, a citizen of the United States of America, and a resident of Springfield, in the county of Hampden and State of Massachusetts, have invented certain new and useful Improvements in Coffee-Pots, of which the following is a full, clear, and exact description.

This invention relates to culinary devices such as are particularly designed for making coffee and like beverages.

The object of my invention is to provide in such a device improved means for holding the ground coffee in a suitable receptacle located over the liquid-receptacle, and also to provide in combination therewith a suitable pump for drawing the liquid up, so that it may percolate through the ground coffee in the upper receptacle, all of which means are arranged to be easily and quickly removed from the receiving vessel or pot proper, and which can be readily taken apart in order to thoroughly cleanse the several parts, and which can be conveniently and quickly reassembled; and my invention comprises such further details of construction and arrangement either separately or in combination as will be set forth hereinafter and then particularly pointed out in the claims.

In the drawings, representing a device embodying my invention in my preferred form of construction and arrangement, Figure 1 is a broken vertical section through the device, certain parts being shown in elevation. Fig. 2 is a top elevation. Fig. 3 shows the receiving-drum. Fig. 4 shows the plunger-tube with its supporting means. Fig. 5 shows the plunger.

Like characters of reference indicate the same parts in the several views.

I provide a usual form of coffee-pot A, that may have a handle M, spout N, and hinged top P. The rim A', to which the lid is hinged, has an inwardly-extending ledge $A^2$. An annular support $a$ comprises a rim $a'$, having an extending ledge $a^2$, which rim is connected with a sleeve H by radial arms J. The support $a$ fits snugly in the rim A' and is supported by the ledge $A^2$. A drum or receptacle B is provided of such a diameter as to fit snugly inside of the ledge $a^2$, but removable therefrom, which ledge is made tapering on its inner face, as shown, in order to facilitate the introduction of the part B to its place of support on the ledge.

The bottom of the receptacle for the coffee is made foraminous and is preferably composed of a wire-gauze ring F, supported on the arms J, and also at its inner and outer edges by the rims $f$ and $a'$ of the support $a$. A barrel or tube C is secured at an intermediate portion to the sleeve H of the support and extends from above the sleeve downwardly nearly to the bottom of the pot A. Its lower portion contains a series of apertures $d$ and its upper portion a series of apertures $e$. The stem D has a piston D' attached to its lower end and slides in the barrel C. The upper portion of the stem D is guided by a bushing-cap $c$, that fits snugly in the top of the barrel C. The upper extremity of the stem D has a knob $b$ secured thereto for operating the stem and piston.

In the operation of the device the coffee-pot is filled about two-thirds or more with boiling water, and then with the parts assembled as shown in Fig. 1 the ground coffee is placed in the receptacle B on top of the strainer F, which latter is fine enough to not permit any of the ground coffee to pass therethrough. Thereupon the piston and stem are drawn upwardly by the knob $b$, which will cause the water that has entered the barrel through the apertures $d$ as soon as the piston passes these apertures to be forced upward, and it will pass out of the barrel through the apertures $e$ at the latter part of the full stroke. Thereupon the boiling water from the apertures $e$ will be deposited on top of the ground coffee in the receptacle B, which will percolate through the coffee, and thus carry a decoction of the latter into the pot A. It will be obvious that the upward stroke of the piston after passing the apertures $d$ will serve to draw the liquid in the receptacle A through these apertures into the barrel, and when the plunger has been drawn upward to its full stroke and has delivered all of the fluid it drew upward through the apertures $e$ it is moved downward. Since the piston D' contains no apertures or valves, it will force all of the liquid that it has drawn into the barrel C out from the latter through the apertures $d$ until the piston has passed below the said apertures and again reaches the position shown in Fig. 1, whereupon the liquid in the pot will again enter the apertures d and rise to the level of the liquid in the pot. It will thus be seen that by reason of the liquid in the pot being drawn in and out of the barrel below the plunger each time it is reciprocated there is insured a thorough admixture of the decoction, and each time the plunger is lowered and then drawn upward a fresh supply of the liquid is deposited on top of the ground coffee in the receptacle B to percolate into the pot again. When the proper decoction has been made in the pot, the receptacle B and the pump are removed from the pot A by grasping the upper portion of the barrel C, and then the top P of the pot can be closed. The coffee-grounds in the vessel B can now be emptied by inverting the latter, and then the piston, stem, and cap are removed from the barrel C. The drum of the barrel B and also the strainer F are removed from the support, whereupon all of these now separate parts can be easily and thoroughly cleansed. When it is desired to make another pot of coffee, the lid P is raised and the several parts can be easily and quickly reassembled in the position shown in Fig. 1, as hereinbefore described.

Having thus described my invention, what I claim is—

1. In a device of the character described, the combination with a fluid-chamber of a percolating-chamber located above the said fluid-chamber and having a foraminous lower portion; a barrel having apertures at its lower portion in communication with the lower portion of said receiving vessel and also having a discharge-opening at its upper portion arranged to deposit liquid passing therethrough onto the contents of said percolating vessel, and a plunger operating said barrel and arranged to be moved upwardly therein from a position below the said lower apertures in the said barrel.

2. In a device of the character described, the combination with a fluid-chamber, of a percolating-chamber located above said chamber and having a foraminous bottom, a barrel passing through said bottom and extending downwardly to the lower portion of said receiving vessel, the barrel having an aperture in its lower portion and also a discharge-opening in a portion thereof above said bottom, and a plunger operating in said barrel and arranged to be moved upwardly therein from a position below the said lower apertures in the said barrel.

3. In a device of the character described, the combination with a fluid-chamber, of a percolating-chamber removably supported in the upper part of the fluid-chamber and having a foraminous bottom, a barrel secured to the percolating-chamber and passing through its bottom, said barrel extending through said percolating-chamber and downwardly into the lower portion of said fluid-chamber, the barrel having apertures in its lower portion and also apertures in its upper portion above said bottom, and a plunger operating in said barrel and arranged to be moved upwardly therein from a position below the said lower apertures in the said barrel.

4. In a device of the character described, the combination of a fluid-chamber, a support comprising an outer rim and an inner sleeve with connecting-arms, the rim being removably supported on said fluid-chamber, a barrel passing through said sleeve and extending downwardly into said fluid-chamber, a percolating-chamber removably mounted on said rim and having a perforated bottom connected therewith, and a plunger operating in said barrel and arranged to force the liquid in the fluid-chamber up into the said percolating-chamber.

5. In a device of the character described, the combination of a fluid-chamber, a support comprising an outer rim and an inner sleeve with connecting-arms, the rim being removably supported on said fluid-chamber, a drum removably supported on said rim, a foraminous ring arranged on said support and extending between said rim and sleeve, a barrel arranged in said sleeve and extending from the upper portion of said drum downwardly to the lower portion of the fluid-chamber, and a plunger operating in said barrel and arranged to force the liquid in the fluid-chamber up into said drum.

6. In a device of the character described, the combination of a fluid-chamber, a support comprising an outer rim and an inner sleeve with connecting-arms, the rim being removably supported on said fluid-chamber, a barrel arranged in said sleeve and extending from the upper portion of said drum downwardly to the lower portion of the fluid-chamber, the barrel having apertures in its lower portion, and a plunger operating said barrel and arranged to be moved upwardly therein from a position below said apertures in the barrel.

7. In a device of the character described, the combination of a fluid-chamber, a support comprising an outer rim and an inner sleeve with connecting-arms, the fluid-chamber having a ledge upon which the support is removably mounted, said rim and sleeve each having a ledge extending into their intermediate space, a foraminous ring removably supported on said latter ledges and said connecting-arms, a drum removably supported in said rim and resting on said ring, a barrel secured in said sleeve and extending from the upper part of said drum downwardly to the lower portion of said fluid-chamber, and a plunger operating in said barrel and arranged to force the liquid in the fluid-chamber up into the drum.

Signed by me in the presence of two subscribing witnesses.

CHARLES H. ATKINS.

Witnesses:
WM. S. BELLOWS,
ANNIE V. LEAHY.